(12) United States Patent
Mori

(10) Patent No.: US 12,160,189 B2
(45) Date of Patent: Dec. 3, 2024

(54) ELECTRIC MOTOR CONTROL METHOD AND ELECTRIC MOTOR CONTROL DEVICE

(71) Applicant: Nissan Motor Co., Ltd., Kanagawa (JP)

(72) Inventor: Kenichi Mori, Kanagawa (JP)

(73) Assignee: Nissan Motor Co., Ltd., Kanagawa (JP)

( * ) Notice: Subject to any disclaimer, the term of this patent is extended or adjusted under 35 U.S.C. 154(b) by 146 days.

(21) Appl. No.: 18/043,172

(22) PCT Filed: Aug. 27, 2020

(86) PCT No.: PCT/JP2020/032482
§ 371 (c)(1),
(2) Date: Feb. 27, 2023

(87) PCT Pub. No.: WO2022/044230
PCT Pub. Date: Mar. 3, 2022

(65) Prior Publication Data
US 2024/0014754 A1    Jan. 11, 2024

(51) Int. Cl.
*H02P 21/00* (2016.01)
*H02P 21/22* (2016.01)
*H02P 27/08* (2006.01)

(52) U.S. Cl.
CPC .......... *H02P 21/0021* (2013.01); *H02P 21/22* (2016.02); *H02P 27/085* (2013.01)

(58) Field of Classification Search
CPC .... H02P 21/0021; H02P 21/22; H02P 27/085; H02P 27/05; H02P 27/04
See application file for complete search history.

(56) References Cited

U.S. PATENT DOCUMENTS

2022/0368265 A1* 11/2022 Kondo ................. H02P 27/085

FOREIGN PATENT DOCUMENTS

| JP | 2007-143235 A | 6/2007 |
| JP | 2013-051799 A | 3/2013 |
| WO | 2019/106729 A1 | 6/2019 |

* cited by examiner

*Primary Examiner* — Karen Masih
(74) *Attorney, Agent, or Firm* — Osha Bergman Watanabe & Burton LLP

(57) ABSTRACT

An electric motor control method is an control method which is capable of selecting a first mode or a second mode as a control mode for controlling an operation of the electric motor according to an operating state of the electric motor. The method, when the second mode is selected as the control mode, stops a part of processing in the first mode, and continuously executes other processing including integral calculation except for the part of processing in the first mode. Also, the method, when the control mode is switched from the second mode to the first mode, starts the part of processing by using at least one control value obtained by continuing the other processing.

9 Claims, 11 Drawing Sheets

ELECTRIC MOTOR CONTROL METHOD AND ELECTRIC MOTOR CONTROL DEVICE

TECHNICAL FIELD

The present invention relates to an electric motor control method and an electric motor control device.

BACKGROUND ART

JP2007-143235A discloses an electric motor drive control device that switches among a plurality of control methods according to a driving state of a motor. In the device, when the control methods are switched, a control value immediately before the switching is set as an initial value of a control variable of a control method after the switching.

SUMMARY OF INVENTION

In the above configuration, when the control method is switched, if the control value immediately before the switching is set as the initial value of the control variable after the switching, there is a problem that the electric motor is not appropriately driven at the time of switching and a torque pulsation occurs. In particular, this problem becomes obvious when the control method is switched during a transient response of the torque.

An object of the present invention is to provide an electric motor control method and an electric motor control device that appropriately drive the electric motor at the time of switching the electric motor control method.

According to an aspect of the present invention, an electric motor control method capable of selecting a first mode or a second mode as a control mode for controlling an operation of the electric motor according to an operating state of the electric motor is provided. The method include: when the second mode is selected as the control mode, stopping a part of processing in the first mode, and continuously executing other processing including integral calculation except for the part of processing in the first mode; and when the control mode is switched from the second mode to the first mode, starting the part of processing by using at least one control value obtained by continuing the other processing.

The above aspect result in providing an electric motor control method and an electric motor control device that appropriately drive the electric motor at the time of switching the electric motor control method

DESCRIPTION OF EMBODIMENTS

Hereinafter, each embodiment will be described with reference to the drawings.

First Embodiment

[Overall Configuration]

Figure 1:
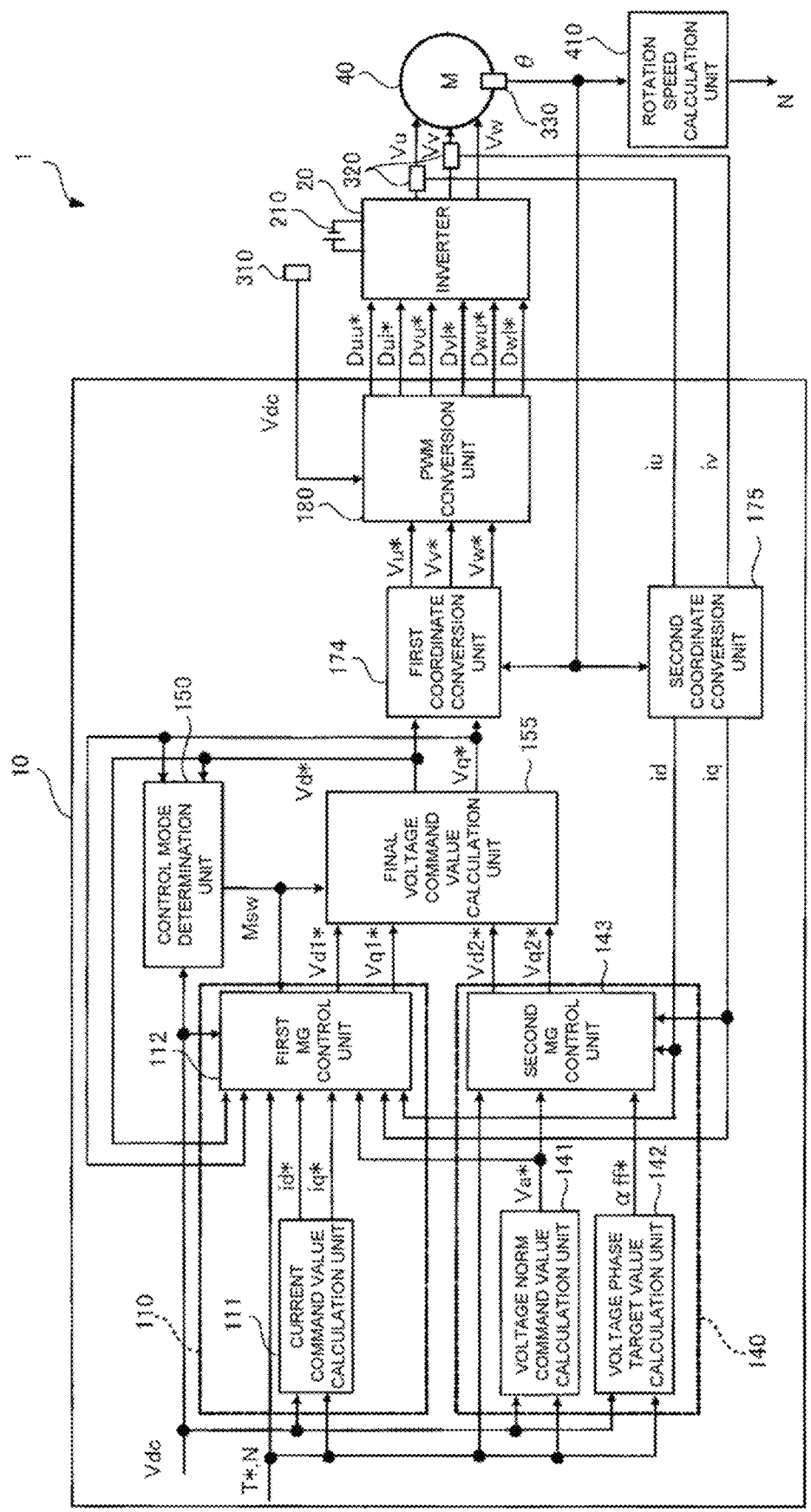
FIG. 1 is a diagram illustrating an example of a functional configuration of an entire power control device according to a first embodiment.

FIG. 1 is a diagram illustrating an example of a functional configuration of an entire power control device 1 according to a first embodiment. The power control system 1 is, for example, a device that is mounted on an electric vehicle and controls driving of an electric motor of the electric vehicle. The power control system 1 can control the electric motor according to two types of control modes, i.e., current vector control and voltage phase control.

Referring to FIG. 1, the power control system 1 includes a controller an inverter 20, and an electric motor 40.

The controller 10 includes, as functions, a current vector control unit 110, a voltage phase control unit 140, a control mode determination unit 150, a final voltage command value calculation unit 155, a first coordinate conversion unit 174, a second coordinate conversion unit 175, and a PWM conversion unit 180.

The current vector control unit 110 includes a current command value calculation unit 111 and a first MG control unit 112.

The current command value calculation unit 111 calculates current command values id* and iq* by using, as inputs, a torque command value T* transmitted from a host device, a motor rotation speed N from a rotation speed calculation unit 410 to be described later, and a DC voltage Vdc from a voltage sensor 310 that detects a DC voltage. The current command value calculation unit 111 outputs the calculated current command values id* and iq* to the first MG control unit 112.

The torque command value T* transmitted from the host device, the DC voltage Vdc from the voltage sensor 310, the motor rotation speed N from the rotation speed calculation unit 410 to be described later, the current command values id* and iq* from the current command value calculation unit 111, dq-axis current detection values id and iq of the electric motor 40, final voltage command values Vd* and Vq* from the final voltage command value calculation unit 155 to be described later, and a voltage norm command value Va* from a voltage norm command value calculation unit 141 to be described later are input to the first MG control unit 112.

The first MG control unit 112 refers to a dq-axis current table generated in advance by an experiment or an analysis, and calculates first voltage command values Vd1* and Vq1* from these input values. Then, the first MG control unit 112 outputs the calculated first voltage command values Vd1* and Vq1* to the final voltage command value calculation unit 155.

The voltage phase control unit 140 includes the voltage norm command value calculation unit 141, a voltage phase target value calculation unit 142, and a second MG control unit 143.

The torque command value T* from the host device, the DC voltage Vdc from the voltage sensor 310, and the motor rotation speed N from the rotation speed calculation unit 410 to be described later are input to the voltage norm command value calculation unit 141. The voltage norm command value calculation unit 141 calculates the voltage norm command value Va* by referring to a table generated in advance by an experiment or an analysis from these input values. The voltage norm command value calculation unit 141 outputs the calculated voltage norm command value Va* to the first MG control unit 112 and the second MG control unit 143.

The voltage phase target value calculation unit 142 calculates a voltage phase target value aff* by using, as inputs, the torque command value T* from the host device, the DC voltage Vdc from the voltage sensor 310, and the motor rotation speed N from the rotation speed calculation unit 410 to be described later. The voltage phase target value calculation unit 142 outputs the calculated voltage phase target value aff* to the second MG control unit 143.

The torque command value T* from the host device, the motor rotation speed N from the rotation speed calculation unit 410 to be described later, the voltage norm command value Va* from the voltage norm command value calculation unit 141, the voltage phase target value αff* from the voltage phase target value calculation unit 142, and dq-axis current detection values id and iq from the second coordinate conversion unit 175 to be described later are input to the second MG control unit 143. The second MG control unit 143 calculates second voltage command values Vd2* and Vq2* from these input values.

Specifically, by using the dq-axis current detection values id and iq and the motor rotation speed N and based on a deviation between a motor torque estimation value Test obtained in advance by an experiment or an analysis and the torque command value T*, the second MG control unit 143 obtains a voltage phase correction value αfb*, which is obtained by performing FB control such as PI control, by the following Equation (1) and calculates a final voltage phase command value α* by adding the voltage phase correction value αfb* to the voltage phase target value αff*. Here, Kp is a proportional gain, and Ki is an integral gain.

[Equation 1]

$$\alpha_{fb}^* = \frac{K_p + K_i}{s}(T^* - T_{est}) \quad (1)$$

Then, the second MG control unit 143 calculates the second voltage command values Vd2* and Vq2* corresponding to a dq-axis through vector conversion of the following Equation (2) by using the calculated voltage phase command value α*. The second MG control unit 143 outputs the calculated second voltage command values Vd2* and Vq2* to the final voltage command value calculation unit 155.

[Equation 2]

$$V_{d2}^* = -V_a^* \sin \alpha^*$$

$$V_{q2}^* = V_a^* \cos \alpha^* \quad (2)$$

The control mode determination unit 150 determines, which control mode between the current vector control and the voltage phase control is to be executed, by using, as inputs, the final voltage command values Vd* and Vq* output from the final voltage command value calculation unit 155 and the DC voltage Vdc from the voltage sensor 310, and outputs a mode signal Msw indicating the control mode to be executed to the first MG control unit 112 and the final voltage command value calculation unit 155. The mode signal Msw is generated based on a modulation rate MF calculated by the following Equation (3).

[Equation 3]

$$MF = \frac{\sqrt{2(V_d^{*2} + V_q^{*2})}}{V_{dc}} \quad (3)$$

The mode signal Msw includes information indicating that the first voltage command values Vd1* and Vq1* calculated by the first MG control unit 112 are selected when the modulation rate MF is less than a predetermined switching threshold. The mode signal Msw when the first voltage command values Vd1* and Vq1* are selected is "1". On the other hand, the mode signal Msw includes information indicating that the second voltage command values Vd2* and Vq2* calculated by the second MG control unit 143 are selected when the modulation rate MF is equal to or greater than the switching threshold. The mode signal Msw when the second voltage command values Vd2* and Vq2* are selected is "0". In order to prevent chattering, it is desirable to provide the switching threshold with hysteresis.

The final voltage command value calculation unit 155 selects one of the first voltage command values Vd1* and Vq1* from the current vector control unit 110 and the second voltage command values Vd2* and Vq2* from the voltage phase control unit 140 based on the value of the mode signal Msw from the control mode determination unit 150, and outputs the selected values as the final voltage command values Vd* and Vq*.

An electric angle detection value θ detected by an electric angle sensor 330 provided in the electric motor 40 and the final voltage command values Vd* and Vq* from the final voltage command value calculation unit 155 are input to the first coordinate conversion unit 174. The first coordinate conversion unit 174 converts the input final voltage command values Vd* and Vq* into three-phase voltage command values Vu*, Vv*, and Vw* based on the following Equation (4). The first coordinate conversion unit 174 inputs the calculated three-phase voltage command values Vu*, Vv*, and Vw* to the PWM conversion unit 180.

[Equation 4]

$$\begin{pmatrix} v_u^* \\ v_v^* \\ v_w^* \end{pmatrix} = \sqrt{\frac{2}{3}} \begin{pmatrix} 1 & 0 \\ -\frac{1}{2} & \frac{\sqrt{3}}{2} \\ -\frac{1}{2} & -\frac{\sqrt{3}}{2} \end{pmatrix} \begin{pmatrix} \cos\theta & -\sin\theta \\ \sin\theta & \cos\theta \end{pmatrix} \begin{pmatrix} v_d^* \\ v_q^* \end{pmatrix} \quad (4)$$

The three-phase voltage command values Vu*, Vv*, and Vw* from the first coordinate conversion unit 174 and the DC voltage Vdc from the voltage sensor 310 are input to the PWM conversion unit 180. The PWM conversion unit 180 performs known processing such as dead time compensation or voltage utilization ratio improvement processing on these inputs, and calculates power element driving signals Duu*, Dul*, Dvu*, Dvl*, Dwu*, and Dwl* of the inverter 20 corresponding to the three-phase voltage command values Vu*, Vv*, and Vw*. The PWM conversion unit 180 outputs the calculated power element driving signals Duu*, Dul*, Dvu*, Dvl*, Dwu*, and Dwl* to the inverter 20.

The power element driving signals Duu*, Dul*, Dvu*, Dvl*, Dwu*, and Dwl* from the PWM conversion unit 180 are input to the inverter 20. The inverter 20 operates switching elements based on the power element driving signals Duu*, Dul*, Dvu*, Dvl*, Dwu*, and Dwl*. Accordingly, an output voltage of a battery 210 is converted into pseudo AC voltages Vu, Vv, and Vw and output to the electric motor 40.

A current sensor 320 detects U-phase and V-phase currents iu, iv, and iw output to the electric motor 40. A W-phase current iw of the electric motor 40 can be obtained by the following Equation (5) in principle by detecting the currents iu and iv.

[Equation 5]

$$i_w = -i_u - i_v \quad (5)$$

The currents iu, iv, and iw detected by the current sensor 320 and the electric angle detection value θ detected by the electric angle sensor 330 are input to the second coordinate conversion unit 175. The second coordinate conversion unit 175 calculates the dq-axis current detection values id and iq based on the following Equation (6) from these input values. The second coordinate conversion unit 175 outputs the calculated dq-axis current detection values id and iq to the first MG control unit 112 and the second MG control unit 143.

[Equation 6]

$$\begin{pmatrix} i_d \\ i_q \end{pmatrix} = \begin{pmatrix} \cos\theta & \sin\theta \\ -\sin\theta & \cos\theta \end{pmatrix} \sqrt{\frac{2}{3}} \begin{pmatrix} 1 & -\frac{1}{2} & -\frac{1}{2} \\ 0 & \frac{\sqrt{3}}{2} & -\frac{\sqrt{3}}{2} \end{pmatrix} \begin{pmatrix} i_u \\ i_v \\ i_w \end{pmatrix} \quad (6)$$

The electric motor 40 is, for example, an electric motor capable of performing power running and regenerative driving. The electric motor 40 is driven based on the pseudo AC voltages Vu, Vv, and Vw output from the inverter 20, and generates a torque for vehicle running or stopping. In addition, the electric motor 40 includes the rotation speed calculation unit 410. The rotation speed calculation unit 410 calculates the motor rotation speed N from the electric angle detection value θ detected by the electric angle sensor 330.

As described above, the power control system 1 according to the present embodiment having the above configuration is a power control system 1 capable of controlling the electric motor 40 according to any control mode among a plurality of control modes, that is, the current vector control and the voltage phase control.

The power control system 1 is centrally controlled by the controller 10. The controller 10 includes a central processing unit (CPU), an input/output interface, and a bus that connects the central processing unit and the input/output interface. The controller 10 may control each unit of the power control system 1 via the input/output interface by reading a control program stored in a memory (recording medium) (not illustrated) and causing the central processing unit to execute the control program.

[Operation in Each Mode]

Figure 2:
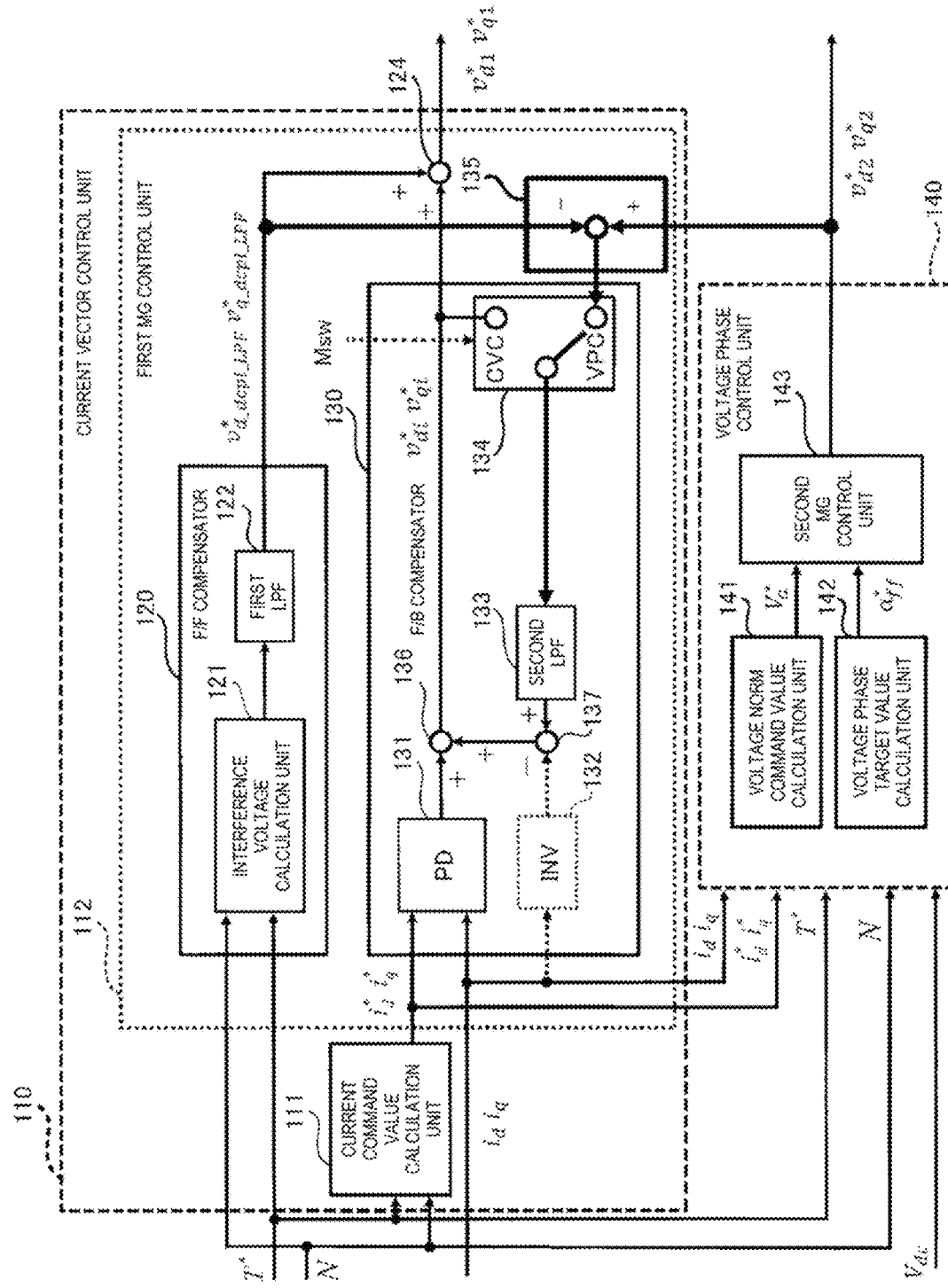
FIG. 2 is a diagram illustrating an example of a functional configuration of voltage phase control according to the present embodiment.
Figure 3:
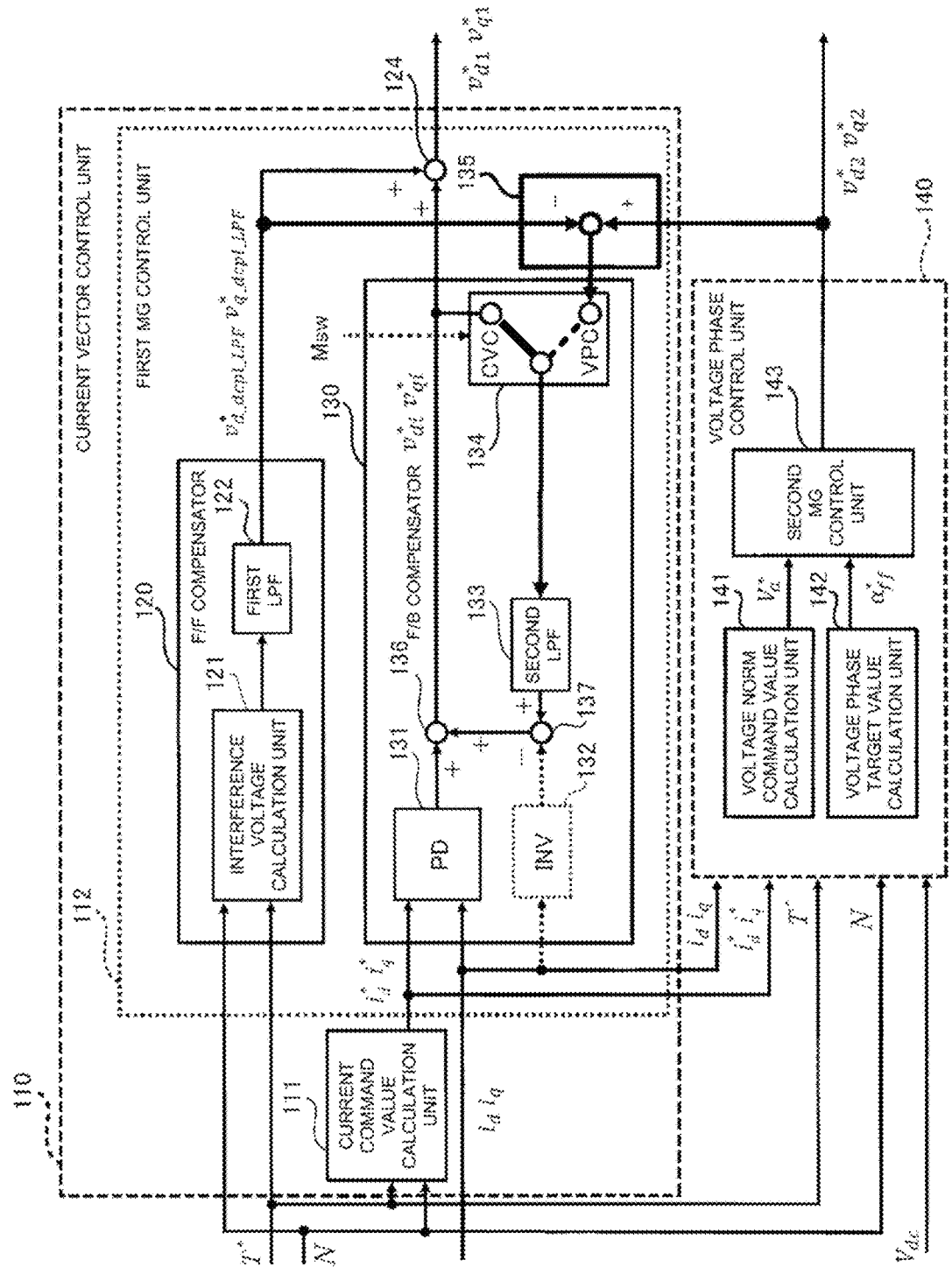
FIG. 3 is a diagram illustrating an example of a functional configuration of current vector control according to the present embodiment.

Next, an operation of each mode will be described with reference to FIGS. 2 and 3. FIG. 2 is a diagram illustrating an example of a functional configuration of the voltage phase control according to the present embodiment. FIG. 3 is a diagram illustrating an example of a functional configuration of the current vector control according to the present embodiment.

A functional configuration of the first MG control unit 112 that is operated during selection of the voltage phase control will be described in detail with reference to FIG. 2. In the present embodiment, even during the selection of the voltage phase control, a part of processing in the current vector control is continuously executed. In the voltage phase control, the value of the mode signal Msw indicating the control mode is "0". In addition, the second voltage command values Vd2* and Vq2* from the second MG control unit 143 are selected according to the value of the mode signal Msw as the final voltage command values Vd* and Vq* at this time.

The first MG control unit 112 includes a feed forward compensator 120, an adder 124, a feedback compensator 130, and an input calculation unit 135.

Further, the feed forward compensator 120 includes an interference voltage calculation unit 121 and a first LPF 122. The torque command value T* from the host device, the DC voltage Vdc from the voltage sensor 310, and the motor rotation speed N from the rotation speed calculation unit 410 are input to the interference voltage calculation unit 121. The interference voltage calculation unit 121 calculates, from these input values, dq-axis interference voltage target values vd_dcpl* and vq_dcpl* by referring to a table created in advance. The interference voltage calculation unit 121 outputs the calculated dq-axis interference voltage target values vd_dcpl* and vq_dcpl* to the first LPF 122.

The first LPF 122 is a smoothing filter having a time constant of a dq-axis current model response. The first LPF 122 calculates interference voltage command values vd_dcpl_LPF* and vq_dcpl_LPF* based on the dq-axis interference voltage target values vd_dcpl* and vq_dcpl* from the interference voltage calculation unit 121. The first LPF 122 outputs the calculated interference voltage command values vd_dcpl_LPF* and vq_dcpl_LPF* to the adder 124.

The interference voltage command values vd_dcpl_LPF* and vq_dcpl_LPF* from the feedback compensator 130 and dq-axis FB voltage command values vdi* and vqi* from the feedback compensator 130 are input to the adder 124. The dq-axis FB voltage command values vdi* and vqi* will be described later. The adder 124 combines these inputs to calculate the first voltage command values Vd1* and Vq1*, and outputs the first voltage command values Vd1* and Vq1* to the final voltage command value calculation unit 155 (see FIG. 1).

The feedback compensator 130 includes a PD control unit 131, an inverse filter 132, a second LPF 133, a switch 134, an adder 136, and a subtractor 137.

The PD control unit 131 generates basic dq-axis FB voltage command values such that a deviation between the current command values id* and iq* from the current command value calculation unit 111 and the dq-axis current detection values id and iq from the second coordinate conversion unit 175 (see FIG. 1) is zero.

The inverse filter 132 has a function of calculating a disturbance component with respect to the basic dq-axis FB voltage command values generated by the PD control unit 131 by using the dq-axis current detection values id and iq as inputs. Details of the function of the inverse filter 132 will be described later.

The switch 134 selectively switches between a connection state (connection with a VPC terminal) in which corrected dq-axis FB voltage command values calculated by the input calculation unit 135 are input to the second LPF 133 and a connection state (connection with a CVC terminal) in which the dq-axis FB voltage command values vdi* and vqi* calculated by the adder 136 are input to the second LPF 133, by using, as inputs, the dq-axis FB voltage command values vdi* and vqi* and the mode signal Msw. More specifically, when the value of the mode signal Msw is "0", that is, when the voltage phase control is indicated (as illustrated in FIG. 2), the switch 134 connects the VPC terminal. On the other hand, when the value of the mode signal Msw is "1", that is, when the current vector control is indicated (as illustrated in FIG. 3), the switch 134 connects the CVC terminal.

The adder 136 calculates the dq-axis FB voltage command values vdi* and vqi* by using, as inputs, the basic dq-axis FB voltage command values from the PD control unit 131 and a calculated value calculated by the subtractor 137, and adding these values.

The second voltage command values Vd2* and Vq2* from the voltage phase control unit 140 during the execution of the voltage phase control and the interference voltage command values vd_dcpl_LPF* and vq_dcpl_LPF* from the feed forward compensator 120 are input to the input calculation unit 135. The input calculation unit 135 calculates the corrected dq-axis FB voltage command values by subtracting the interference voltage command values vd_dcpl_LPF* and vq_dcpl_LPF* from the second voltage command values Vd2* and Vq2*. Then, the input calculation unit 135 outputs the calculated corrected dq-axis FB voltage command values to the switch 134.

Further, when the value of the mode signal Msw is "0" (when the voltage phase control is being executed), the feedback compensator 130 mainly executes processing of the PD control unit 131 and the second LPF 133, that is, processing other than that of the inverse filter 132. In other words, during the selection of the voltage phase control, the feedback compensator 130 continuously outputs the dq-axis FB voltage command values vdi* and vqi* by continuously executing the processing other than that of the inverse filter 132. Then, when the feedback compensator 130 outputs the calculated dq-axis FB voltage command values vdi* and vqi* to the adder 124, the adder 124 outputs the first voltage command values Vd1* and Vq1*.

Here, the inverse filter 132 that is stopped during the selection of the voltage phase control has a function of calculating a disturbance component with respect to the dq-axis FB voltage command values vdi* and vqi* from the PD control unit 131, that is, a function of increasing accuracy of the first voltage command values Vd1* and Vq1* as a result. However, since the electric motor 40 corresponds to a high rotation region during the selection of the voltage phase control, a proportion of the disturbance component to a driving torque is small, and thus the influence of the disturbance component on the dq-axis current detection values id and iq is also small. Further, during the selection of the voltage phase control, since the first voltage command values Vd1* and Vq1* are not output as the final voltage command values Vd* and Vq*, a necessity to improve the accuracy of the first voltage command values Vd1* and Vq1* by operating the inverse filter 132 is low. In other words, it can be said that a substantial function of the feedback compensator 130 is secured even if the processing of the inverse filter 132 is stopped.

As described above, in the power control system 1 according to the present embodiment, when the voltage phase control is selected, a computation load of the controller 10 is reduced by stopping the processing of the inverse filter 132 serving as the part of processing in the current vector control, and the other processing (in particular, processing including integral calculation) is continuously executed. Accordingly, while the voltage phase control is selected, the processing of generating the voltage command value affected by a basic calculation function used for the processing in the current vector control, in particular, a plurality of calculation results is continued even during the execution of the voltage phase control. Here, processing greatly affected by the plurality of calculation results includes the processing of the first LPF 122 and the second LPF 133 that perform the integral calculation.

Next, a function when the current vector control is selected will be described with reference to FIG. 3.

FIG. 3 illustrates details of a functional configuration of the first MG control unit 112 that is executed during selection of the current vector control. In the present embodiment, when the current vector control is selected, the switch 134 connects an input terminal of the second LPF 133 to the CVC terminal.

When the input terminal of the second LPF 133 is connected to the CVC terminal, the feedback compensator 130 generates the dq-axis FB voltage command values vdi* and vqi* by performing feedback processing on the current command values id* and iq* from the current command value calculation unit 111 by using the PD control unit 131, the inverse filter 132, and the second LPF 133.

Here, an operation of the power control system 1 when the voltage phase control is switched to the current vector control will be described.

In the present embodiment, when the voltage phase control is switched to the current vector control, the voltage command values continuously calculated during the selection of the voltage phase control is also continuously input at a timing of switching the control mode. Specifically, at the timing of switching the control mode, the corrected dq-axis FB voltage command values obtained by subtracting the interference voltage command values vd_dcpl_LPF* and vq_dcpl_LPF* from the second voltage command values Vd2* and Vq2* from the input calculation unit 135 are input to the feedback compensator 130.

Further, in the present embodiment, when the voltage phase control is switched to the current vector control, the processing of the inverse filter 132 serving as the part of processing during the current vector control, which is stopped during the selection of the voltage phase control, is started.

Figure 4:
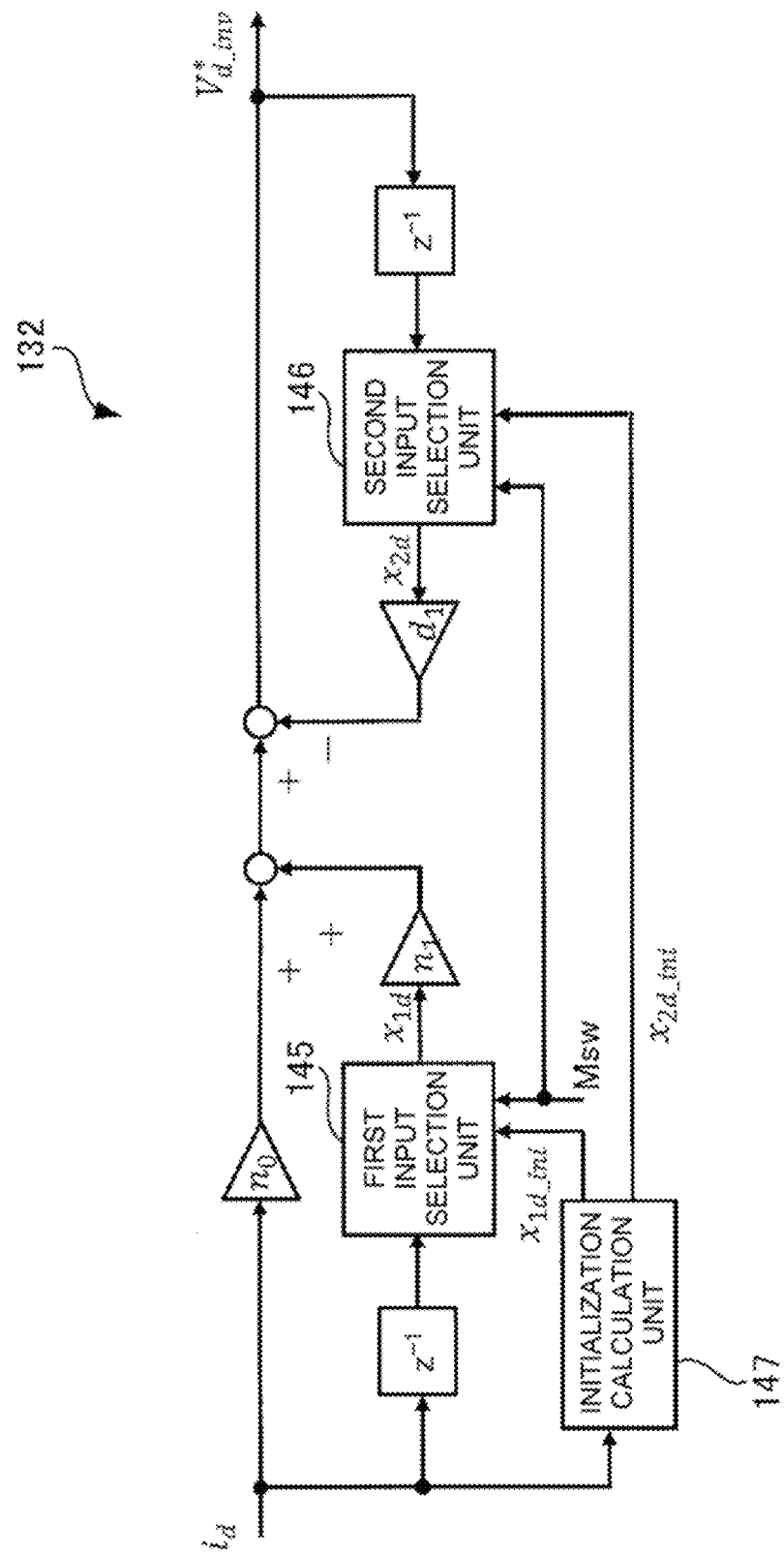
FIG. 4 is a diagram illustrating an example of a functional configuration of an inverse filter according to the present embodiment.

The processing of the inverse filter 132 will be described with reference to FIG. 4. FIG. 4 is a diagram illustrating an example of a functional configuration of the inverse filter 132.

The inverse filter 132 includes a first input selection unit 145, a second input selection unit 146, and an initialization calculation unit 147.

The mode signal Msw from the control mode determination unit 150 (see FIG. 1) and a first initial value x1d_ini from the initialization calculation unit 147 to be described later are input to the first input selection unit 145. When the value of the mode signal Msw is "1", that is, during the selection of the current vector control, the first input selection unit 145 outputs a first output value x1d. On the other hand, only when the value of the mode signal Msw is switched from "0" to "1", that is, when the control mode is switched from the voltage phase control to the current vector control, the first input selection unit 145 outputs the first initial value x1d_ini. More specifically, the first input selection unit 145 outputs the first initial value x1d_ini in a first control period after the control mode is switched, and outputs the first output value x1d in a subsequent control period. As described above, the first input selection unit 145 selects and outputs one of the first output value x1d and the first initial value x1d_ini according to the mode signal Msw.

The mode signal Msw from the control mode determination unit 150 (see FIG. 1) and a second initial value x2d_ini from the initialization calculation unit 147 are input to the second input selection unit 146. When the value of the mode signal Msw is "1", that is, during the selection of the current vector control, the second input selection unit 146 outputs a second output value x2d. On the other hand, only when the value of the mode signal Msw is switched from "0" to "1", that is, when the control mode is switched from the voltage phase control to the current vector control, the second input selection unit 146 outputs the second initial value x2d_ini. More specifically, the second input selection unit 146 outputs the second initial value x2d_ini in the first control period after the control mode is switched, and outputs the second output value x2d in the subsequent control period. As described above, the second input selection unit 146 selects and outputs one of the second output value x2d and the second initial value x2d_ini according to the mode signal Msw.

During the selection of the current vector control, that is, when the value of the mode signal Msw is "1", the inverse filter 132 calculates inverse filter voltage command values Vd_inv* and Vq_inv* by the following Equation (7).

[Equation 7]

$$V_{d\_inv}^* = n_0 \cdot i_d + n_1 \cdot x_1 - d_1 \cdot x_2$$

$$V_{q\_inv}^* = n_0 \cdot i_q + n_1 \cdot x_1 - d_1 \cdot x_2 \qquad (7)$$

On the other hand, when the voltage phase control is switched to the current vector control, that is, when the mode signal Msw is switched from "0" to "1", the stopped processing of the inverse filter 132 is started. At this time, if a past control variable value held while the processing of the inverse filter 132 is stopped is used as it is, there is a concern that appropriate inverse filter voltage command values Vd_inv* and Vq_inv* may not be calculated at the time of switching. Therefore, in the present embodiment, when the mode is switched, that is, when the mode signal Msw is switched from "0" to "1", the inverse filter 132 is initialized by using the initialization calculation unit 147.

The initialization calculation unit 147 calculates first initial values x1d_ini, x1q_ini as initial values to be output from the first input selection unit 145 by Equation (8), and calculates second initial values x2d_ini and x2q_ini to be output from the second input selection unit 146 by Equation (9). "$z^{-1}$" represents an operator for returning to a previous sample value, "$n_0$" and "$n_1$" represent resistance components of the electric motor 40 that change transiently, and "Rc" represents a winding resistance value Rc of the electric motor 40 (that is, a resistance component that is not transiently converted).

[Equation 8]

$$x_{1d\_ini} = i_d \cdot z^{-1} \qquad (8)$$

$$x_{1q\_ini} = i_q \cdot z^{-1}$$

[Equation 9]

$$x_{2d_{ini}} = n_0 \cdot i_d \cdot z^{-1} + n_1 \cdot i_d \cdot z^{-2} - d_1 \cdot R_c \cdot i_d \cdot z^{-1} \qquad (9)$$

$$x_{2q\_ini} = n_0 \cdot i_q \cdot z^{-1} + n_1 \cdot i_q \cdot z^{-2} - d_1 \cdot R_c \cdot i_q \cdot z^{-1}$$

As shown in the Equation (8), the first initial values x1d_ini and x1q_ini to be output from the first input selection unit 145 are initialized by the previous sample dq-axis current detection values id and iq. In addition, as shown in Equation (9), the second initial values x2d_ini and x2q_ini to be output from the second input selection unit 146 are initialized based on the previous sample dq-axis current detection values id and iq, the two previous sample dq-axis current detection values id and iq, and a product "Rc·id" of the winding resistance value Rc assumed as that the electric motor 40 is in a steady state (a resistance component that does not change transiently) and the dq-axis current detection values id and iq.

As described above, the inverse filter 132 is stopped (not functioning) during the selection of the voltage phase control, and, at a timing when the voltage phase control is switched to the current vector control, the processing of the inverse filter 132 starts with, as initial values, the inverse filter voltage command values Vd_inv* and Vq_inv* calculated based on the multiple previous dq-axis current detection values id and iq when it is assumed that the processing is continuously executed during the selection of the voltage phase control. The multiple previous dq-axis current detection values id and iq may be stored in a memory (not illustrated).

The processing of the inverse filter 132 is stopped when the voltage phase control is selected (when the current vector control is not selected) since a necessity to improve the accuracy of a processing result of the inverse filter 132 is low as described above. Accordingly, the computation load of the controller 10 is reduced. In addition, the control variable of the inverse filter 132 is initialized at the timing when the voltage phase control is switched to the current vector control. Accordingly, even when the control mode is switched, since preferable inverse filter voltage command values Vd_inv* and Vq_inv* can be calculated, as a result, preferable final voltage command values Vd* and Vq* are calculated even when the control mode is switched.

[Control Method]

Figure 5:
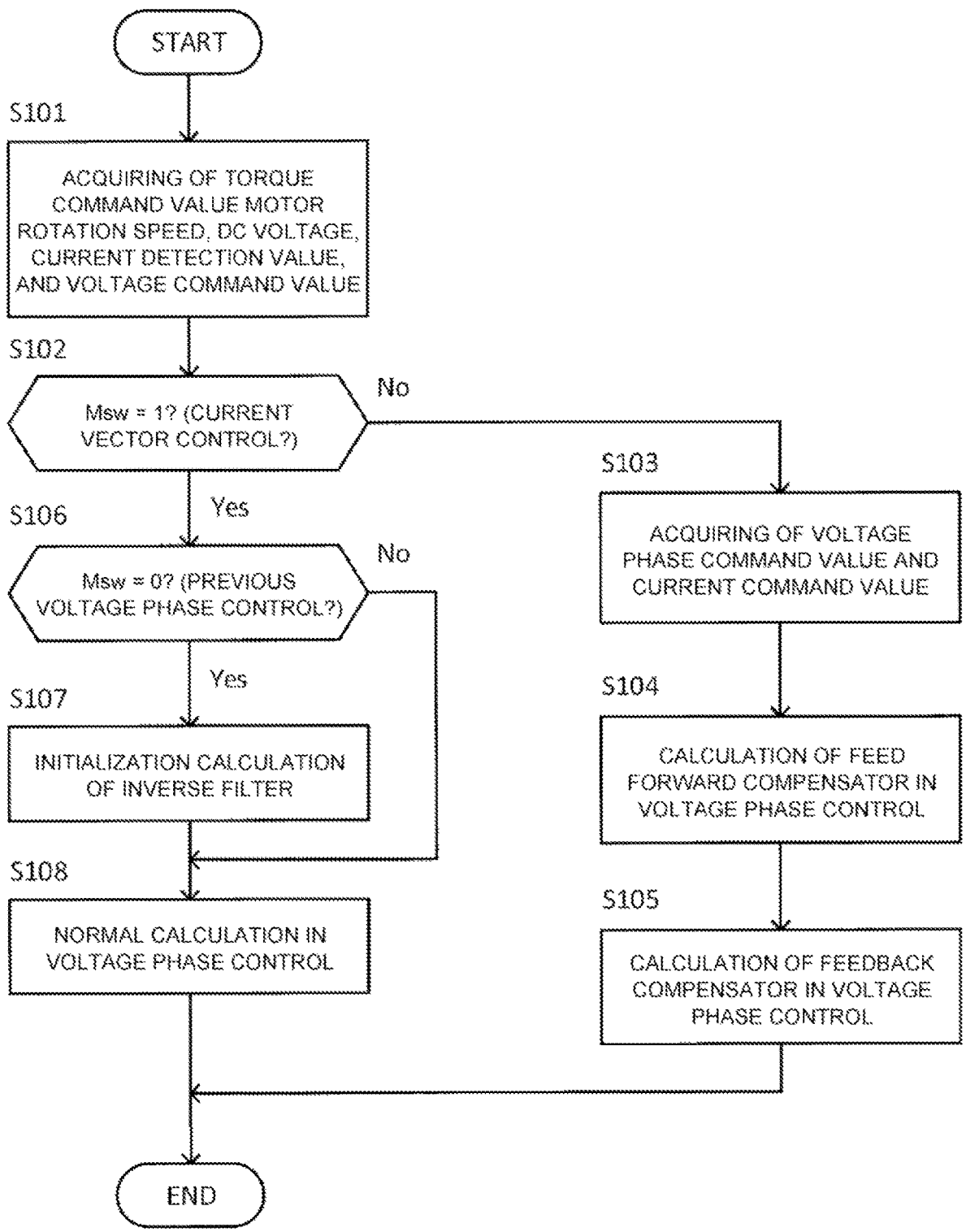
FIG. 5 is a flowchart illustrating an example of an electric motor control method according to the present embodiment.

Next, a control method of the power control system 1 will be described with reference to FIG. 5. FIG. 5 is a flowchart illustrating an example of a power control method according to the present embodiment.

A series of processing illustrated in FIG. 5 may be constantly executed by the controller 10 while a power supply of the power control system 1 is turned on, for example. Alternatively, the series of processing may be started and ended by a predetermined input operation performed by the user.

In step S101, the controller 10 acquires various values such as the torque command value T*, the motor rotation speed N, the DC voltage Vdc, the dq-axis current detection values id and iq, and the final voltage command values Vd* and Vq*.

In step S102, the controller 10 determines whether the current vector control is being selected based on the value of the mode signal Msw. When the mode signal Msw is not "1", the controller 10 determines that the voltage phase control is being selected (the current vector control is not being selected), and the process proceeds to step S103.

In step S103, the controller 10 acquires the current command values id* and iq* and the voltage phase command value α*.

In step S104, the controller 10 executes processing of the feed forward compensator 120. As described above, the controller 10 calculates, in the feed forward compensator 120, the interference voltage command values vd_dcpl_LPF* and vq_dcpl_LPF* based on the control values acquired in steps S101 and S103.

In step S105, the controller 10 executes processing of the feedback compensator 130. As described above, the controller 10 calculates, in the feedback compensator 130, the dq-axis FB voltage command values vdi* and vqi* based on the control values acquired in steps S101 and S103.

On the other hand, in step S102, when the mode signal Msw is "1", the controller 10 determines that the current vector control is being selected, and the process proceeds to step S106.

In step S106, the controller 10 determines whether previous voltage phase control is selected according to the value of the mode signal Msw. Specifically, when the controller 10 determines that the value of an immediately preceding mode signal Msw is "0", the process proceeds to step S107. That is, a case of proceeding to the processing of step S107 is a case where the current control period is a first control period after the previous voltage phase control is switched to the current vector control.

Then, in step S107, the controller 10 executes initialization of the inverse filter 132 described with reference to FIG. 4. That is, initialization calculation based on the above Equations (8) and (9) is executed. As described above, when the voltage phase control is switched to the current vector control, it is desirable to initialize the inverse filter 132.

On the other hand, when the controller 10 determines in step S106 that the value of the immediately preceding mode signal Msw is "1", the process proceeds to step S108. That is, a case of proceeding to the processing of step S108 is a case where the current control period is a control period later than the first control period after the switching.

Then, in step S108, the controller 10 executes the processing in the current vector control. That is, the switch 134 connects the input terminal of the second LPF 133 to the CVC terminal to generate the first voltage command values Vd1* and Vq1*. In addition, in the inverse filter 132, a normal calculation based on the above Equation (7) is executed.

In the above embodiment, the case where the voltage phase control (second mode) is switched to the current vector control (first mode) is described. However, the current vector control is one type of the first mode, and the second mode is one type of the voltage phase control. That is, any control mode may be used as long as the first mode and the second mode are different types of control.

Actions and effects of the above present embodiment will be described.

According to the present embodiment, a control method for the electric motor 40 capable of selecting the current vector control (first mode) or the voltage phase control (second mode) for controlling an operation of the electric motor 40 according to an operating state of the electric motor 40 is provided. In the control method, when the voltage phase control (second mode) is selected, the processing of the inverse filter 132 (a part of processing) among the processing in the current vector control (first mode) is stopped, and other processing including the integral calculation except for the processing of the inverse filter 132 (the part of processing) in the current vector control (first mode) is continuously executed, and when the voltage phase control (second mode) is switched to the current vector control (first mode), the processing of the inverse filter 132 (the part of processing) is started by using the control values obtained by continuing the other processing.

As described above, in the control method according to the present embodiment, the other processing including the integral calculation is continuously executed until immediately before the switching. Then, when the control mode is switched, a control variable of other processing obtained by continuously executing the integral calculation is acquired, and the control mode after the switching is executed by using the acquired control variable. Specifically, the other processing including the integral calculation among the processing in the current vector control processing is continuously executed even during the selection of the voltage phase control. Therefore, an operating state of the motor when the voltage phase control immediately before the switching is selected (dq-axis current detection values id and iq before the switching, and the like) can be preferably reflected in integral calculation executed using the initial value of the control variable when the control mode is switched to the current vector control. The integral processing in the present embodiment is mainly executed by the first LPF 122 and the second LPF 133, and other filters (not illustrated). Accordingly, smooth torque control can be achieved even when the control mode is switched. In particular, a torque pulsation in a scene in which the control mode is switched during a transient response of the torque (in a case where a change in the operating state of the electric motor 40 before and after the switching is large) can be suppressed. Further, even though a control value of a control period before the previous time based on an integral value obtained by continuously executing the processing can be used, since a part of processing having a low necessity to be continuously executed is selectively stopped, the computation load of the controller 10 can be reduced.

In addition, the part of processing may include initialization processing of setting the initial value of the control variable in the current vector control. In the control method of the present embodiment, when the voltage phase control (second mode) is switched to the current vector control (first mode), it is desirable to start the initialization processing, and determine, in the initialization processing, the initial value of the control variable in the current vector control (first mode) by using the control values obtained by continuing the other processing during the selection of the voltage phase control (second mode).

As described above, in the control method of the present embodiment, since the initialization processing is included in the part of processing, even if the part of processing is stopped during the selection of the voltage phase control, the initial value of the part of processing can be set to an appropriate value based on the control values obtained by continuing the other processing when the mode is switched. Since the part of processing is started based on the initial value when the control mode is switched, smooth torque control can be achieved even when the control mode is switched.

In the initialization processing, it is desirable to determine the initial value based on a previous value with respect to a control period after the switching of the control mode, among the control values obtained by continuing the other processing during the selection of the voltage phase control (second mode).

As described above, in the present embodiment, since a previous value of the other processing continuously calculated in the voltage phase control before the switching of the control mode is input to the feedback compensator 130 and calculation after the switching of the control mode is started, smooth torque control can be achieved even when the control mode is switched. Further, since the feed forward compensator 120 also starts the calculation after the switching of the control mode by using a value calculated based on the previous value, smoother torque control can be achieved when the control mode is switched.

It is desirable that the part of processing includes the processing of the inverse filter 132 (inverse filter processing) that calculates the disturbance component.

As described above, even if the processing of the inverse filter 132 is stopped during the selection of the voltage phase control, the initial value of the control variable of the inverse filter 132 is determined by using the previous value with respect to the control period in the current vector control after the switching as shown in the above Equations (8) and (9), so that the processing of the inverse filter 132 can be started in a state close to a state in which the processing of the inverse filter 132 is continuously executed. Accordingly, smooth torque control can be achieved even when the control mode is switched.

In the initialization processing, the initial value is determined based on the dq-axis current detection values (previous values) id and iq among the control values obtained by continuing the other processing during the selection of the voltage phase control (second mode) and the product of the winding resistance value Rc of the electric motor 40 and the dq-axis current detection values id and iq (state amount of the steady state of the electric motor 40) in the voltage phase control (second mode) before the switching of the control mode.

As described above, the initial value of the inverse filter 132 is set based on the dq-axis current detection values id and iq, and the control value of the steady state of the electric motor 40 in the voltage phase control. Accordingly, even if the part of processing is actually stopped during the selection of the voltage phase control, the part of processing can be started in a state substantially equal to a case where the processing is not stopped by using the control value of the steady state of the electric motor 40. Therefore, originally, smooth torque control is achieved even when the mode is switched by continuing the calculation without stopping the processing, but in the present embodiment, smooth torque control can be achieved without continuing the calculation, and thus the computation load of the controller 10 can be reduced.

It is desirable that the other processing includes processing of the feedback compensator 130 excluding the inverse filter 132, which generates a voltage command value to be supplied to the electric motor 40 (command value calculation processing).

As described above, since the command value calculation processing for calculating the voltage command value is continuously executed as the other processing even during the selection of the voltage phase control, a voltage command value having a small deviation from the voltage command value before the switching can be obtained even when the voltage phase control is switched to the current vector control. Accordingly, smooth torque control can be achieved even when the control mode is switched.

The other processing may include processing of the feed forward compensator 120 (feed forward compensation calculation processing). In the feed forward compensation calculation processing, processing of calculating the interference voltage command values vd_dcpl_LPF* and vq_dcpl_LPF* (interference voltages) by the interference voltage calculation unit 121 (interference voltage calculation processing) and processing of smoothing the calculated interference voltages by the first LPF (first low-pass filter processing) are executed. When the control mode is switched from the voltage phase control (second mode) to the current vector control (first mode), it is desirable to execute interference voltage removal processing of subtracting the interference voltage command values vd_dcpl_LPF* and vq_dcpl_LPF* (interference voltages) after executing the processing of the first LPF 122 (first low-pass filter processing) from the second voltage command values Vd2* and Vq2* (state amounts) of the electric motor 40 detected during the selection of the voltage phase control (second mode), and execute the processing in the first mode based on the state amounts of the electric motor 40 after executing the interference voltage removal processing.

As described above, when the mode is switched, values obtained by subtracting the interference voltage command values vd_dcpl_LPF* and vq_dcpl_LPF* as outputs of the feed forward compensator 120 in the current vector control after the switching from the second voltage command values Vd2* and Vq2* calculated in the voltage phase control before the switching corresponds outputs of the feedback compensator 130 in the current vector control after the switching, so that an initial state of the control variable in the current vector control can be set correctly by using the values as inputs of the feedback compensator 130 when the value of the control variable is switched. Accordingly, smooth torque control can be achieved even when the control mode is switched.

Second Embodiment

Next, the power control system 1 according to a second embodiment will be described with reference to FIG. 6. The second embodiment is different from the first embodiment in that the first MG control unit 112 further includes an input correction unit 160. In addition, although not illustrated, the second embodiment is different from the first embodiment in that the second MG control unit 143 (see FIG. 1) outputs the voltage phase command value α* to the first MG control unit 112.

Figure 6:
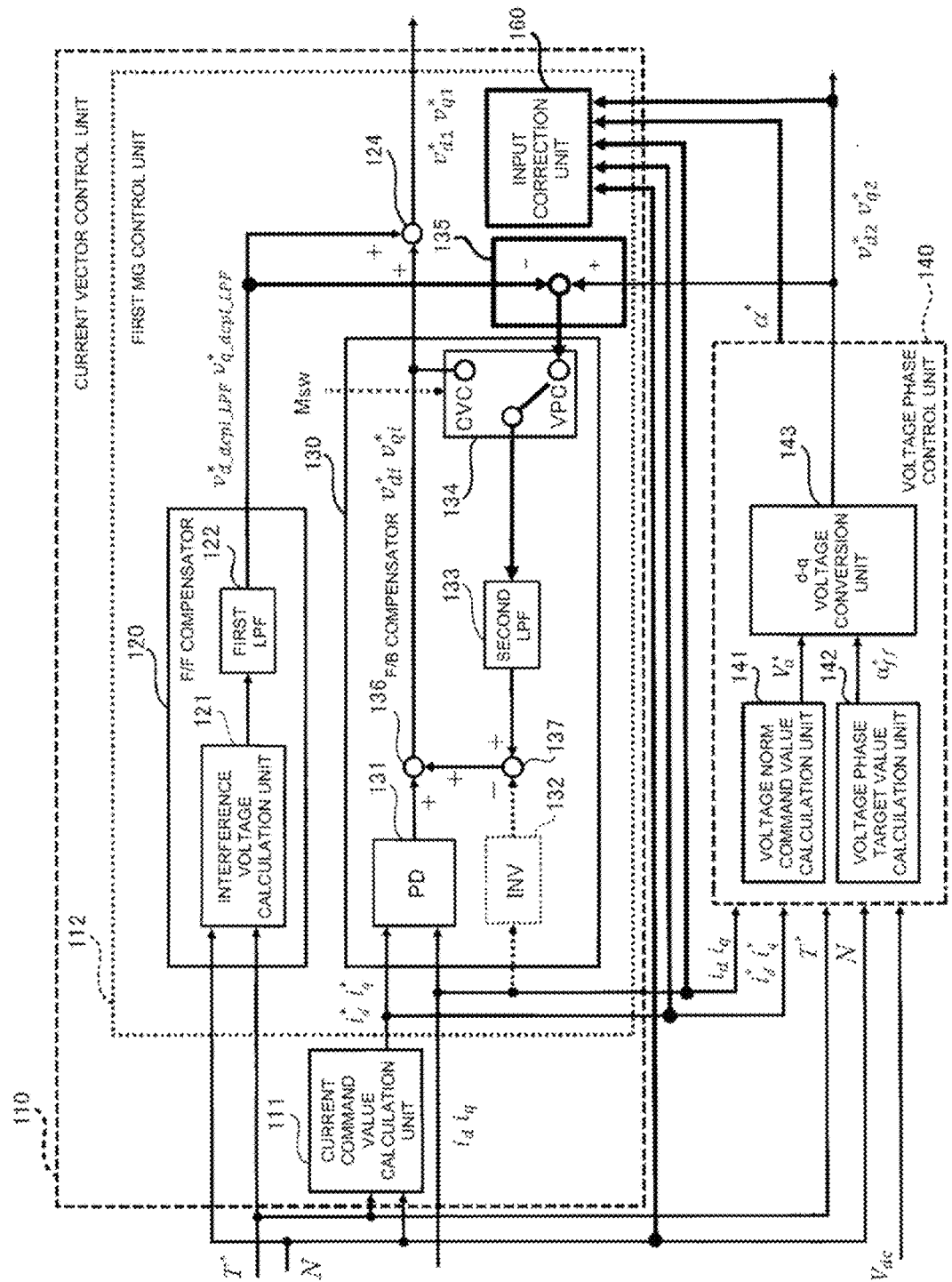
FIG. 6 is a diagram illustrating an example of a functional configuration of voltage phase control according to a second embodiment.

FIG. 6 is a diagram illustrating a functional configuration of the power control system 1 during selection of voltage phase control according to the second embodiment. In the present embodiment, while the voltage phase control is selected, the input correction unit 160 calculates correction values for the second voltage command values Vd2* and Vq2* output from the voltage phase control unit 140 (see FIG. 6). The correction value is determined from a viewpoint of obtaining the corrected dq-axis FB voltage command values (input voltage command values to the feedback compensator 130) obtained by correcting the second voltage command values Vd2* and Vq2* when a control mode is switched from a viewpoint of achieving a maximum efficiency output in current vector control.

Figure 7:
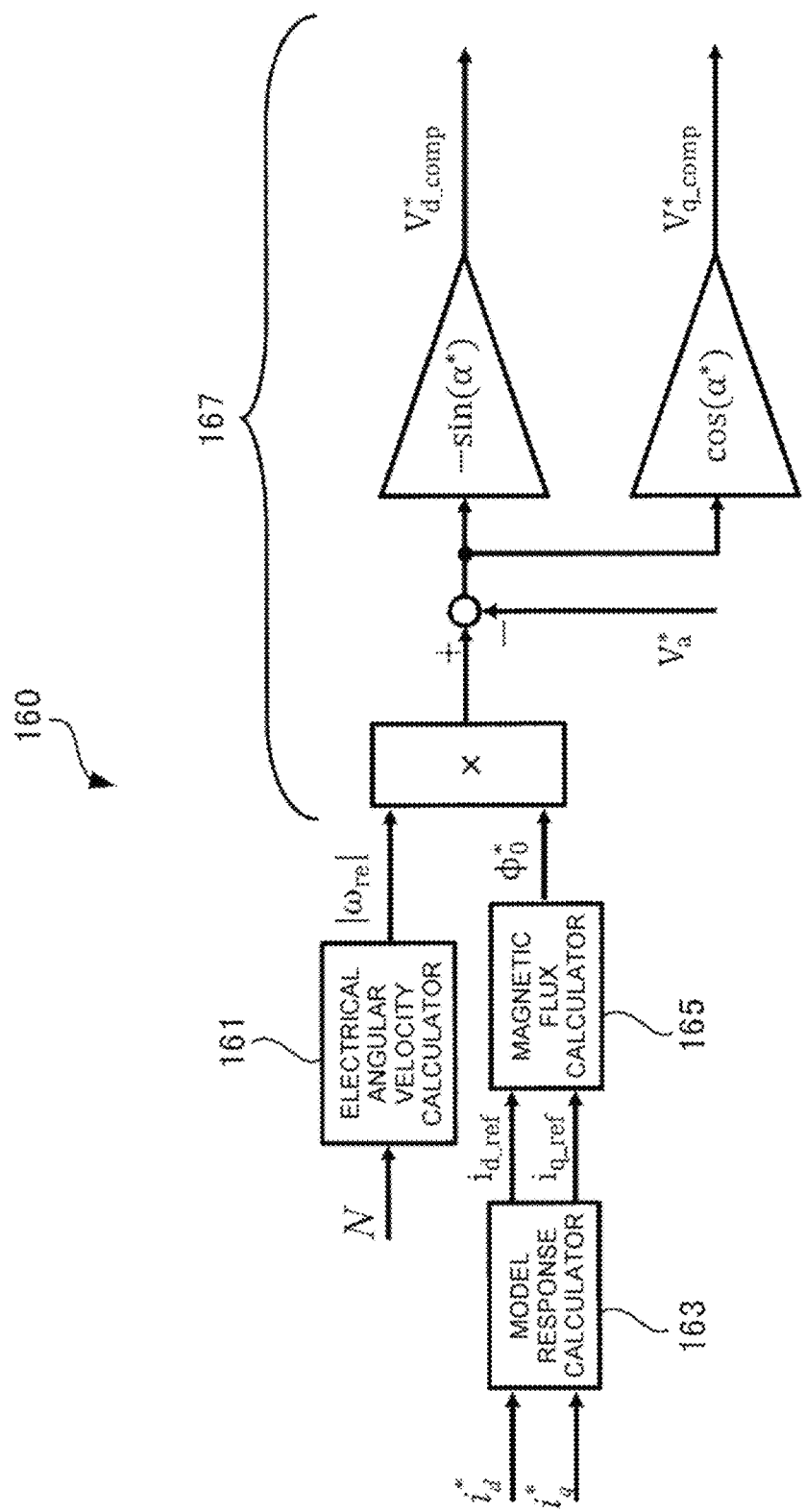
FIG. 7 is a diagram illustrating an example of a functional configuration of a correction unit according to the present embodiment.

FIG. 7 is a diagram illustrating details of the input correction unit 160. The input correction unit 160 includes, as functions, an electric angular velocity calculator 161, a model response calculator 163, a magnetic flux calculator 165, and a comparator 167.

The electric angular velocity calculator 161 calculates an electric angular velocity absolute value |ωre| according to Equation (10) by using the motor rotation speed N from the rotation speed calculation unit 410 as an input. The electric angular velocity calculator 161 outputs the calculated electric angular velocity absolute value |ωre| to the comparator 167. In Equation (10), "p" is the number of pole pairs of the electric motor 40.

[Equation 10]

$$|\omega_{re}| = p \cdot N \cdot \frac{2\pi}{60} \quad (10)$$

The current command values id* and iq* generated by the current command value calculation unit 111 (see FIG. 6) are input to the model response calculator 163. The model response calculator 163 calculates current model responses id_ref and iq_ref via a low-pass filter having a time constant of the current model response based on the current command values id* and iq*. The model response calculator 163 outputs the calculated current model responses id_ref and iq_ref to the magnetic flux calculator 165.

The magnetic flux calculator 165 calculates a magnetic flux norm command value φ0* by using the current model responses id_ref and iq_ref from the model response calculator 163 as inputs and referring to a table created in advance. The magnetic flux calculator 165 outputs the calculated magnetic flux norm command value φ0* to the comparator 167.

The electric angular velocity absolute value |ωre| from the electric angular velocity calculator 161, the magnetic flux norm command value φ0* from the magnetic flux calculator 165, the voltage norm command value Va*, and the voltage phase command value α* are input to the comparator 167. The comparator 167 calculates a voltage command value (|ωre|·φ0) for achieving maximum efficiency in operation of the electric motor 40 from the current command values id* and iq* and the magnetic flux norm command value φ0*, and compares the voltage command value (|ωre|·φ0) with the voltage norm command value Va* in the voltage phase control to determine a correction amount. Specifically, the comparator 167 calculates correction voltage command values Vd_comp* and Vq_comp* by the following Equation (11).

[Equation 11]

$$V_{d\_comp}^* = -(|\omega_{re}|\cdot\phi_0^* - V_a^*)\sin\alpha^*.$$

$$V_{q\_comp}^* = (|\omega_{re}|\cdot\phi_0^* - V_a^*)\sin\alpha^* \quad (11)$$

As can be seen from the Equation (11), the correction voltage command values Vd_comp* and Vq_comp* correspond to differences between ideal voltage command values for achieving the maximum efficiency and the second voltage command values Vd2* and Vq2* that are actually determined during the voltage phase control. While the voltage phase control is selected, the input correction unit 160 continues the calculation of the correction voltage command values Vd_comp* and Vq_comp*. During this time, the low-pass filter provided in the model response calculator 163 is maintained in an operating state.

Figure 8:
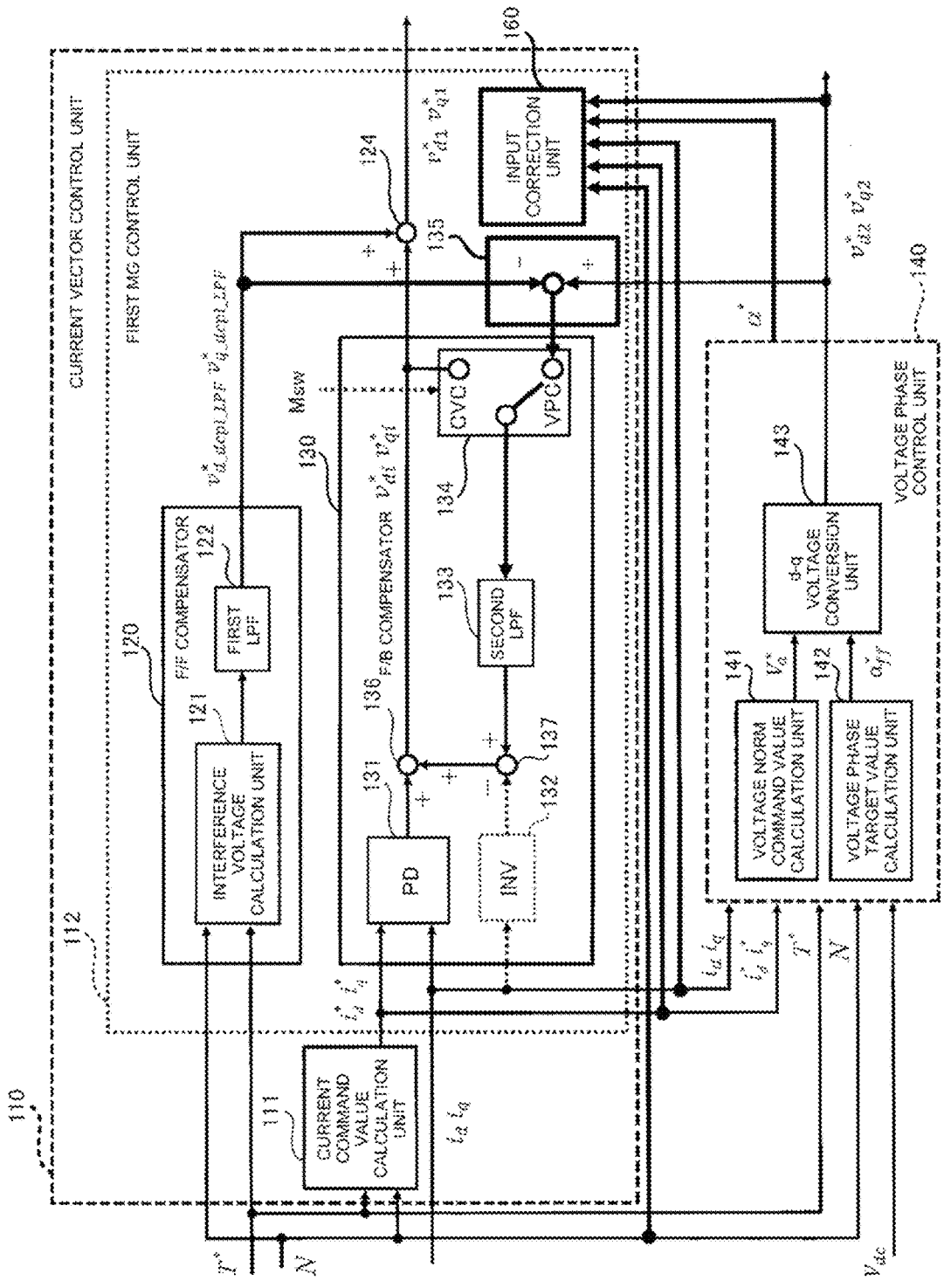
FIG. 8 is a diagram illustrating an example of a functional configuration of current vector control according to the present embodiment.

Then, as illustrated in FIG. 8, when the control mode is switched from the voltage phase control to the current vector control, the input correction unit 160 outputs the calculated correction voltage command values Vd_comp* and Vq_comp* to the input calculation unit 135 (see FIG. 6).

The input calculation unit 135 outputs maximum efficiency voltage command values Vdi2* and Vqi2* calculated by the following Equation (12) to an input terminal of the second LPF 133.

[Equation 12]

$$V_{di2}^* = V_{d2}^* - V_{d\_dcpl\_LPF}^* + V_{d\_comp}^*$$

$$V_{qi2}^* = V_{q2}^* - V_{q\_dcpl\_LPF}^* + V_{q\_comp}^* \quad (12)$$

As described above, when the voltage phase control is switched to the current vector control, the maximum efficiency voltage command values Vdi2* and Vqi2* obtained by the input correction unit 160 correcting the second voltage command values Vd2* and Vq2* by using the correction voltage command values Vd_comp* and Vq_comp* are input instead of the corrected dq-axis FB voltage command values in the first embodiment to the feedback compensator 130.

Figure 9:
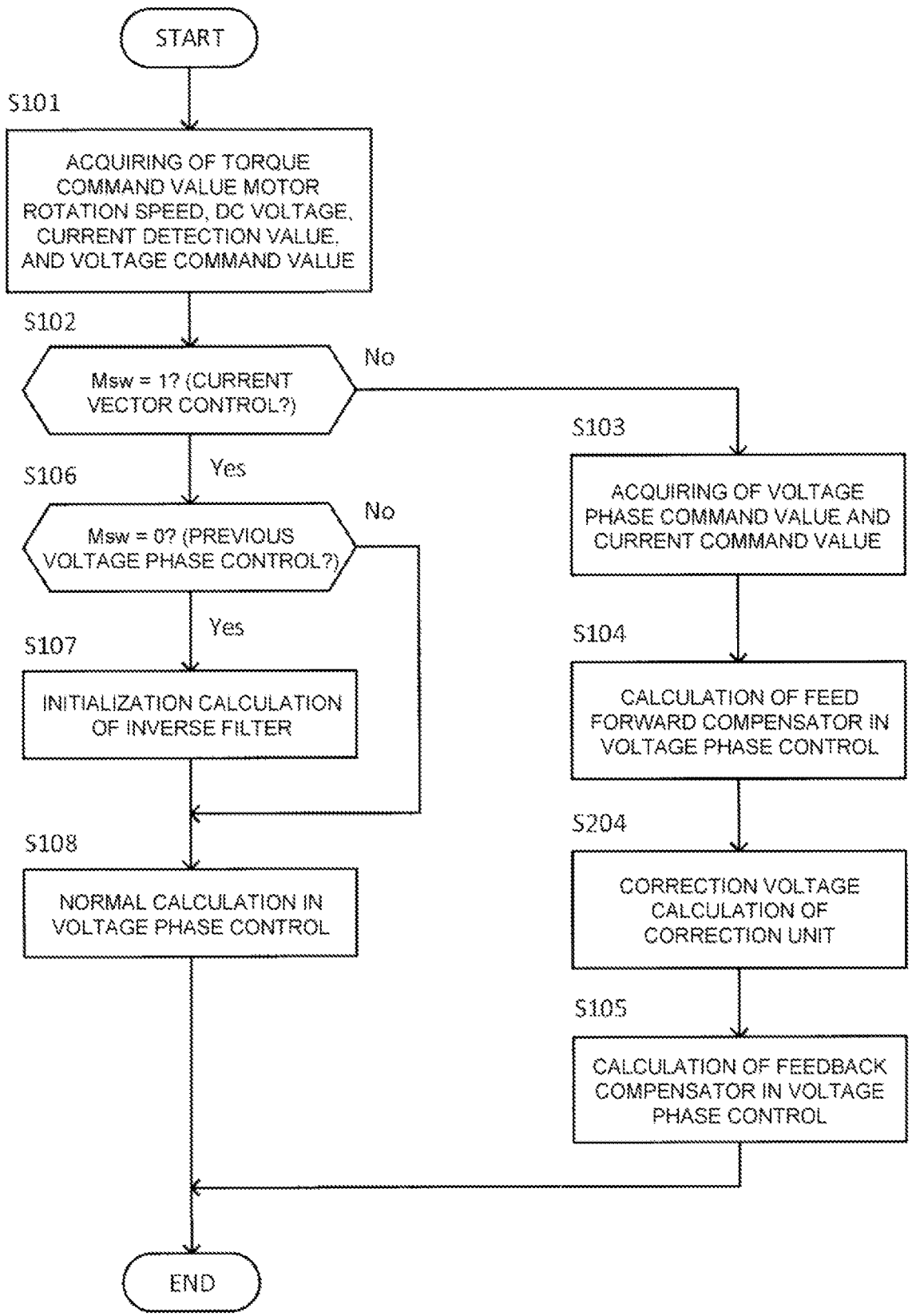
FIG. 9 is a flowchart illustrating an example of an electric motor control method according to the present embodiment.

FIG. 9 is a flowchart illustrating an example of a control method according to the present embodiment. The control method according to the present embodiment is different from the control method according to the first embodiment in that processing of step S204 is added. Therefore, since the processing other than that of step S204 is the same as those in the first embodiment, the description thereof will be omitted.

Specifically, as illustrated in FIG. 9, when it is determined in step S102 that the voltage phase control is not being selected, the controller 10 acquires various values in step S103, and executes processing of the feed forward compensator 120 (interference voltage calculation) in step S104. Then, in step S204, the controller 10 calculates the correction voltage command values Vd_comp* and Vq_comp* by the above input correction unit 160. Further, in step S105, the controller 10 executes calculation of the feedback compensator 130. An order of the processing of step S104, step S204, and step S105 is not limited to the order illustrated in FIG. 9.

Next, a behavior of the power control system 1 to which the present embodiment is applied will be described with reference to FIGS. 10 and 11. A control method according to a comparative example is different from the control method according to the present embodiment in that initialization processing of the inverse filter 132 is not executed when the control mode is switched.

Figure 10:
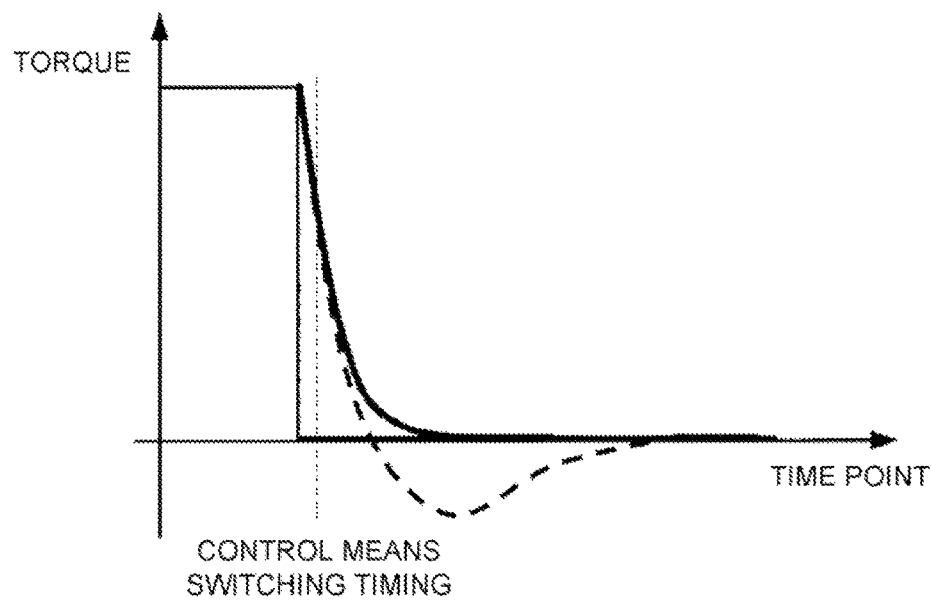
FIG. 10 is a diagram illustrating an example of an output torque to which the present embodiment is applied.

FIG. 10 is a diagram illustrating an example of an output torque of the electric motor 40 to which the present embodiment is applied. As described with reference to FIG. 2, FIG. 8 illustrates a response of a driving torque when the controller 10 continues the calculation during the selection of the voltage phase control by using an output of the second MG control unit 143 as an input of the second LPF 133 and then switches the voltage phase control to the current vector control in a torque step. In this case, in the comparative example (broken line), undershooting occurs after the switching of the control mode, whereas the output torque (thick solid line) in the present embodiment converges to a target value (thin solid line) without undershooting.

Figure 11:
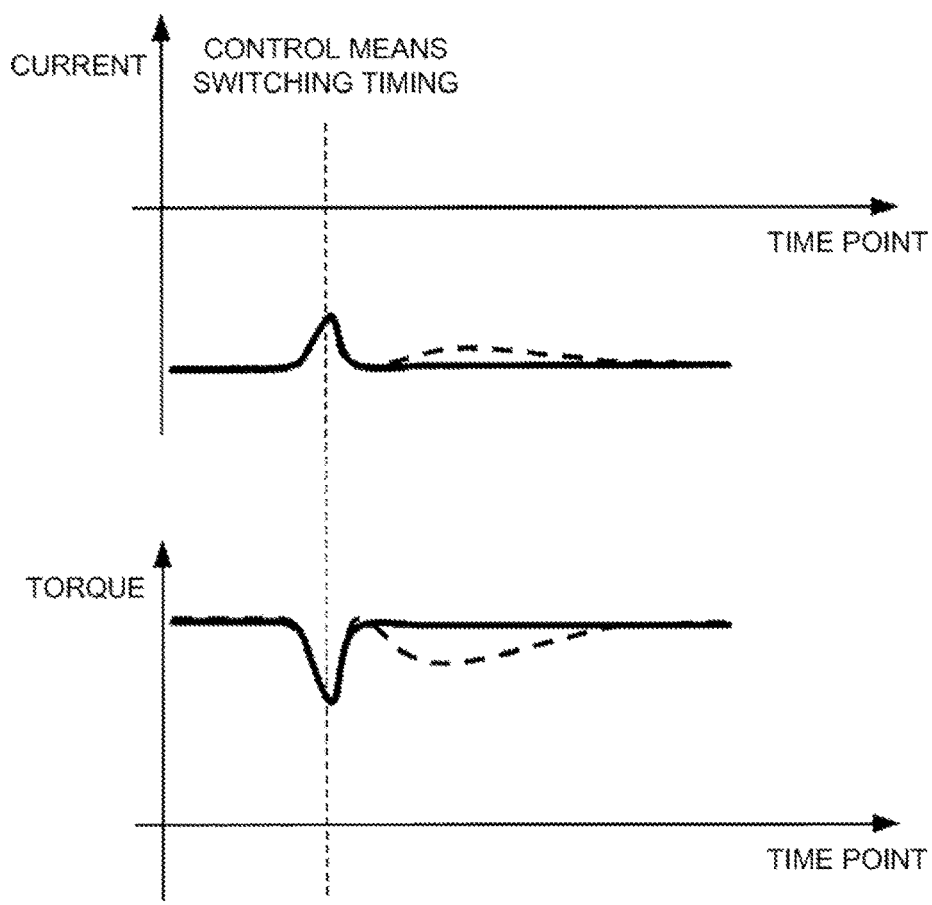
FIG. 11 is a diagram illustrating an effect of initialization of an inverse filter to which the present embodiment is applied.

FIG. 11 is a diagram illustrating a behavior when the initialization processing of the inverse filter 132 according to the present embodiment is executed. When the mode is switched at a timing when a current ripple is large, an influence of the current ripple remains in the comparative example (broken line), and a torque pulsation after the mode switching occurs. In contrast, according to the present embodiment, since the initialization processing of the inverse filter 132 is performed when the mode is switched, the influence of the current ripple can be suppressed and the torque pulsation can be suppressed (see the solid line).

Actions and effects of the above present embodiment will be described.

According to the present embodiment, other processing may further include correction processing. In the correction processing, when the current vector control is selected as the control mode, it is desirable to calculate a correction value for correcting a command value by using integral calculation, and to correct the command value based on the correction value when the control mode is switched from the voltage phase control to the current vector control.

As described above, since the correction processing in the input correction unit 160 includes the integral calculation, the input correction unit 160 can be maintained in the operating state by continuously executing the integral calculation even during the selection of the voltage phase control before the switching of the control mode. Accordingly, an appropriate value is applied as an initial value of the correction value when the control mode is switched, and thus smooth torque control can be achieved.

In the correction processing, it is desirable to calculate the correction value based on a difference between the voltage norm command value Va* in the voltage phase control and a product of the electric angular velocity absolute value |ωre| serving as a voltage norm required for achieving the maximum efficiency in operation of the electric motor 40 and the magnetic flux norm command value φ0*.

As described above, even when the torque control is performed in a state where a voltage utilization ratio is maximized before switching from the voltage phase control to the current vector control, there is a case in which an actual current deviates from the current command values id* and iq* having the maximum efficiency in the current vector control. Even in such a case, since the current command values id* and iq* are continuously calculated before the switching of the control mode, by correcting the input voltage command values to the feedback compensator 130 based on the difference between the voltage norm command value Va* in the voltage phase control and the product of the magnetic flux norm command value φ0* obtained based on the current command values id* and iq* and the electric angular velocity absolute value |ωre|, the torque pulsation after switching to the current vector control can be prevented, and smooth torque control can be achieved.

(Modification)

Figure 12:
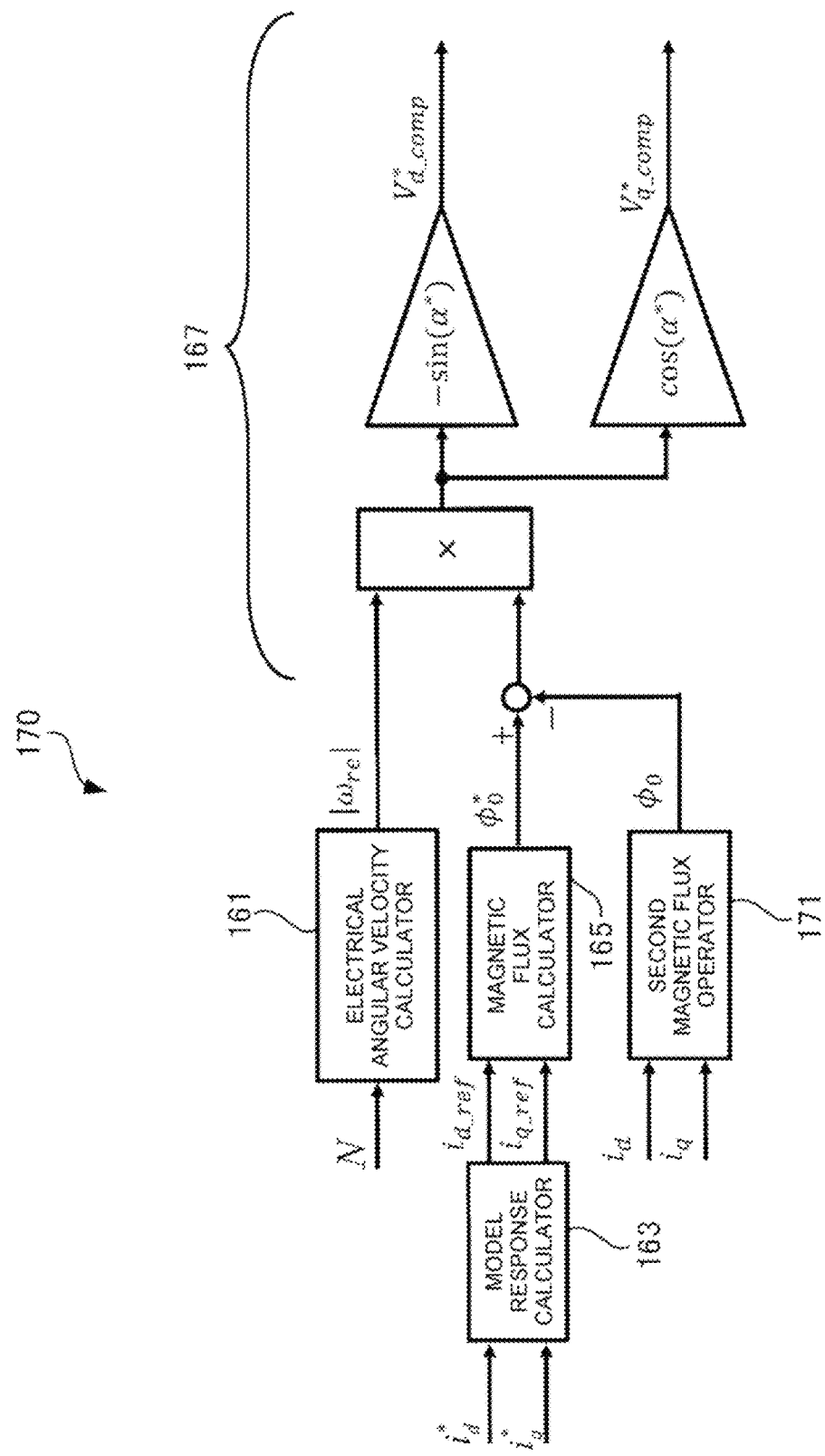
FIG. 12 is a diagram illustrating an example of a functional configuration of a correction unit according to a modification.

Next, a modification of the above second embodiment will be described. FIG. 12 is a diagram illustrating details of an input correction unit 170 according to the present modification. The modification is different from the second embodiment only in a configuration of the input correction unit 170, and other configurations are the same.

A second magnetic flux calculator 171 is added to the input correction unit 170 with respect to the input correction unit 160 of the second embodiment. Since the electric angular velocity calculator 161, the model response calculator 163, the magnetic flux calculator 165, and the comparator 167 of the input correction unit 170 are the same as those of the input correction unit 160 according to the second embodiment, descriptions thereof will be omitted.

The second magnetic flux calculator 171 of the input correction unit 170 calculates a magnetic flux norm φ0 by referring to a table created in advance and by using the dq-axis current detection values id and iq as inputs. That is, in the present modification, a correction amount is determined based on the magnetic flux norm φ0 calculated from the actual current in the voltage phase control and the magnetic flux norm command value φ0* for achieving maximum efficiency. Specifically, the correction voltage command values Vd_comp* and Vq_comp* are calculated by the following Equation (13) by using the voltage phase command value α*, the calculated electric angular velocity absolute value |ωre|, the magnetic flux norm command value φ0*, and the voltage norm command value Va*.

[Equation 13]

$$V_{d\_comp}^* = -|\omega_{re}| \cdot (\phi_0^* - \phi_0) \sin \alpha^*$$

$$V_{q\_comp}^* = |\omega_{re}| \cdot (\phi_0^* - \phi_0) \cos \alpha^* \quad (13)$$

Although the embodiments of the present invention have been described above, the above embodiments are merely a part of application examples of the present invention, and are not intended to limit the technical scope of the present invention the specific configurations of the above embodiments. For example, the above feedback compensator 130 may be configured by another feedback processing function such as a PI controller.

The invention claimed is:

1. An electric motor control method capable of selecting a first mode or a second mode as a control mode for controlling an operation of the electric motor according to an operating state of the electric motor, the method comprising:
   when the second mode is selected as the control mode, executing a processing of the first mode, the processing of the first mode including a first processing for stopping the processing and a second processing including integral calculation for continuously executing the processing; and
   when the control mode is switched from the second mode to the first mode, starting the first processing by using at least one control value obtained by continuing the second processing.

2. The electric motor control method according to claim 1, wherein
   the second processing includes feed forward compensation calculation processing,
   in the feed forward compensation calculation processing, interference voltage calculation processing of calculating an interference voltage and first low-pass filter processing of smoothing the calculated interference voltage are executed,
   when the control mode is switched from the second mode to the first mode, interference voltage removal processing of subtracting the interference voltage after executing the first low-pass filter processing from the state amount of the electric motor detected during the selection of the second mode is executed, and the processing in the first mode is executed based on the state amount of the electric motor after executing the interference voltage removal processing.

3. An electric motor control device capable of selecting a first mode or a second mode as a control mode for controlling an operation of the electric motor according to an operating state of the electric motor, wherein
when the second mode is selected as the control mode, executing a processing of the first mode, the processing of the first mode including a first processing for stopping the processing and a second processing including integral calculation for continuously executing the processing, and
when the control mode is switched from the second mode to the first mode, the first processing is started by using at least one control value obtained by continuing the second processing.

4. The electric motor control method according to claim 1, wherein
the first processing includes initialization processing of setting an initial value of a control variable in the first mode by using the at least one control value obtained by continuing the second processing during selection of the second mode, and/or
the second processing includes command value calculation processing of generating a voltage command value to be supplied to the electric motor.

5. The electric motor control method according to claim 4, wherein
in the initialization processing, the initial value is determined based on a previous value with respect to a control period after switching the control mode among the at least one control value obtained by continuing the second processing during the selection of the second mode.

6. The electric motor control method according to claim 4, wherein
the first processing includes inverse filter processing for calculating a disturbance component.

7. The electric motor control method according to claim 6, wherein
in the initialization processing, the initial value is determined based on a previous value and a state amount of a steady state of the electric motor in the second mode before switching the control mode among the at least one control value obtained by continuing the second processing during the selection of the second mode.

8. The electric motor control method according to claim 4, wherein
the second processing further includes correction processing, and
in the correction processing, a correction value for correcting the voltage command value by using the integral calculation is calculated when the second mode is selected as the control mode, and the voltage command value is corrected based on the correction value when the control mode is switched from the second mode to the first mode.

9. The electric motor control method according to claim 8, wherein
in the correction processing, the correction value is calculated based on a difference between a voltage norm of the voltage command value in the second mode and a voltage norm required for achieving maximum efficiency in operation of the electric motor.

* * * * *